(12) United States Patent
Paterson

(10) Patent No.: US 7,137,239 B2
(45) Date of Patent: Nov. 21, 2006

(54) PRICKLE CHAIN LINK

(76) Inventor: Kentyn Scott Paterson, PO Box 43, Bute (AU) 5560

( * ) Notice: Subject to any disclaimer, the term of this patent is extended or adjusted under 35 U.S.C. 154(b) by 0 days.

(21) Appl. No.: 11/126,406

(22) Filed: May 11, 2005

(65) Prior Publication Data

US 2005/0262823 A1   Dec. 1, 2005

(30) Foreign Application Priority Data

May 25, 2004   (AU)   ............................... 2004202209

(51) Int. Cl.
*F16G 13/06* (2006.01)
*B21L 1/00* (2006.01)
(52) U.S. Cl. ................... 59/85; 59/80; 59/83
(58) Field of Classification Search ............ 59/78, 59/82, 85, 93
See application file for complete search history.

(56) References Cited

U.S. PATENT DOCUMENTS

| 250,242 | A | * | 11/1881 | Haxton | 59/93 |
|---|---|---|---|---|---|
| 1,375,724 | A | * | 4/1921 | Oponiak et al. | 59/85 |
| 1,702,946 | A | * | 2/1929 | Powers et al. | 59/93 |
| 2,145,990 | A | * | 2/1939 | Nelson | 59/85 |
| 3,126,865 | A | * | 3/1964 | Wiegardt, Jr. | 59/93 |
| 3,310,122 | A | * | 3/1967 | Mack | 59/93 |
| 3,331,489 | A | * | 7/1967 | Mattson | 59/93 |
| 3,603,078 | A | * | 9/1971 | Schwiebert et al. | 59/85 |
| 3,906,716 | A | * | 9/1975 | Dock | 59/85 |
| 4,685,555 | A | * | 8/1987 | Smith | 59/85 |
| 4,893,463 | A | * | 1/1990 | Woolford | 59/27 |
| 5,000,270 | A | * | 3/1991 | Phillips | 59/93 |
| 6,484,812 | B1 | * | 11/2002 | Clark | 59/93 |

* cited by examiner

*Primary Examiner*—David Jones
(74) *Attorney, Agent, or Firm*—Nath & Associates PLLC; Gregory B. Kang; Derek Richmond

(57) ABSTRACT

A cast prickle chain link element, and a prickle chain made by interconnecting a plurality of these links. Each link element includes a body, the body having at least one hole, and at least one hook formed into it, and at least one ground engaging finger projecting outwardly from the body. The hook formed into the body of one element, is adapted to engage the hole formed into the body of another identical element, thereby facilitating the linking of elements in order to form a prickle chain.

13 Claims, 6 Drawing Sheets

PRICKLE CHAIN LINK

Figure 1:
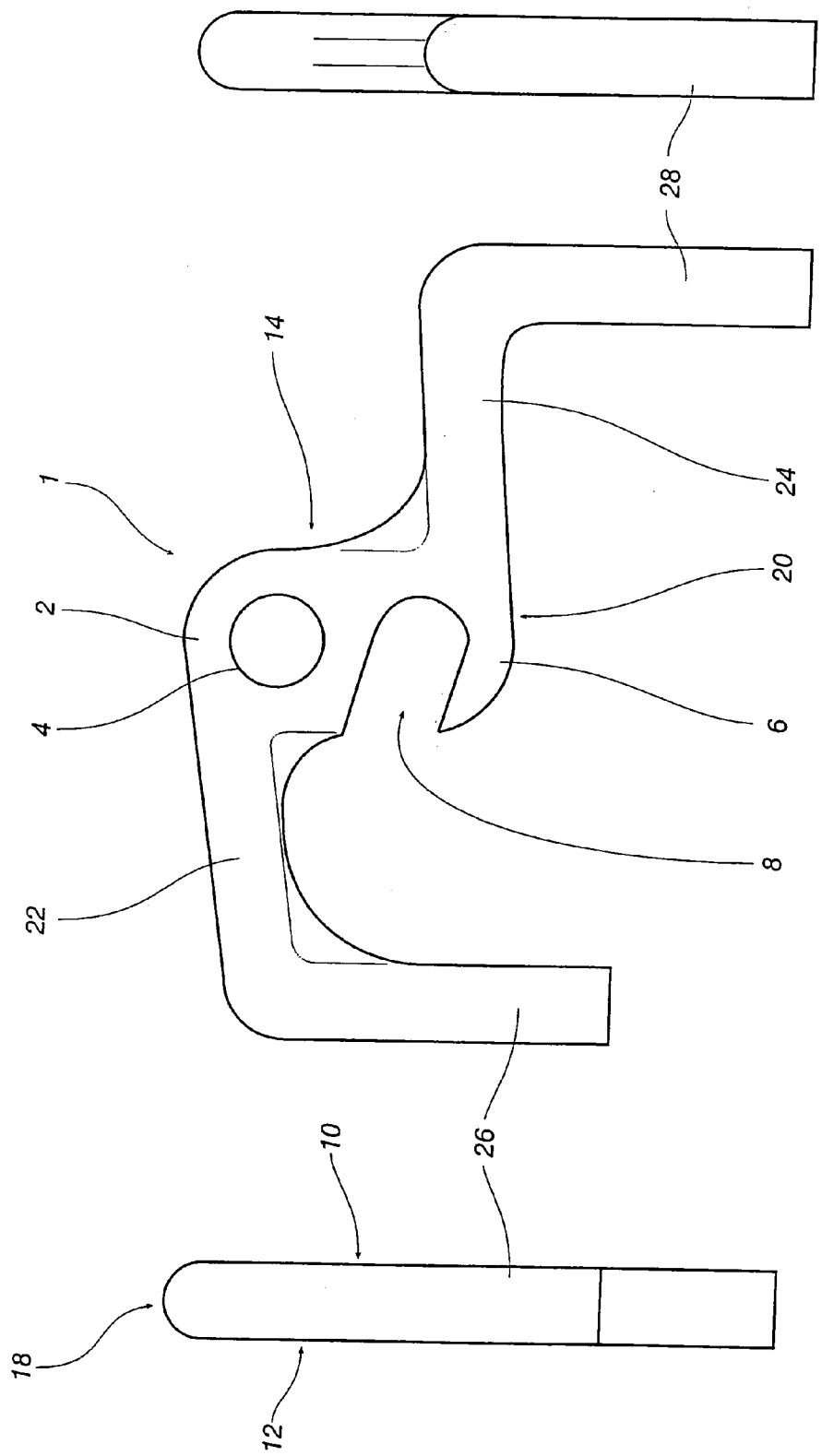

The present invention relates to a prickle chain link element and a prickle chain made by interconnecting a plurality of these links, and a method for making these.

A prickle chain is an agricultural or farming tool that is retained at each end by a frame and dragged along the ground in a direction that is substantially normal to the chain's direction of elongation, for the purpose of clearing or tilling the earth.

Most prickle chain link elements and the prickle chains made from these links are fabricated using a combination of bending and welding operations. As such the amount of time and labour required to produce a single link element can be quite high.

It is an object of the present invention to provide a prickle chain link element that is relatively quick and therefore cheap to manufacture, and a prickle chain made from these links.

Other objects and advantages of the present invention will become apparent from the following description, taken in connection with the accompanying drawings, wherein, by way of illustration and example, an embodiment of the present invention is disclosed.

In one form of this invention although this may not necessarily be the only or indeed the broadest form of this there is proposed a prickle chain link element that is produced using a casting operation.

In a further form, the invention may be said to lie in a prickle chain link element including a body, the body having at least one hole, and at least one hook formed into it, and at least one ground engaging finger projecting outwardly from the body.

Preferably, the prickle chain link element is produced using a casting operation.

Preferably, the hook in the body of the element defines a slot through the body.

Preferably, the hook formed into the body of one element, is adapted to engage the hole formed into the body of another identical element.

Preferably, the body of each element has an opposed top and bottom face, a pair of opposed side faces, and an opposed front edge and back face.

Preferably, the hole, and the slot created by the hook, pass through from the top face to the bottom face of the body.

Preferably, each element includes a pair of outwardly projecting ground engaging fingers, one projecting from each side face of the body.

Preferably, one ground engaging finger projects from the body such that it is aligned with the front face of the body, and the second ground engaging finger projects from the body such that it is aligned with the rear face of the body.

Preferably, the hole is positioned near the front face of the body, and the hook is formed into the rear face of the body, on the opposite side of the body to the ground-engaging finger in the rear face.

In a further form the invention may be said to lie in a prickle chain formed from a plurality of cast links.

In a further form, the invention may be said to lie in a method of producing a prickle chain including the steps of casting a plurality of link elements, and then linking these elements in order to form a prickle chain.

Preferably, the elements are linked by engaging the hook in the body of a first link element, in the hole in the body of a second identical link element.

Preferably, the elements are linked such a first link element lies in plain orthogonal to the elements linked to it on either side of the first element.

Figure 2:
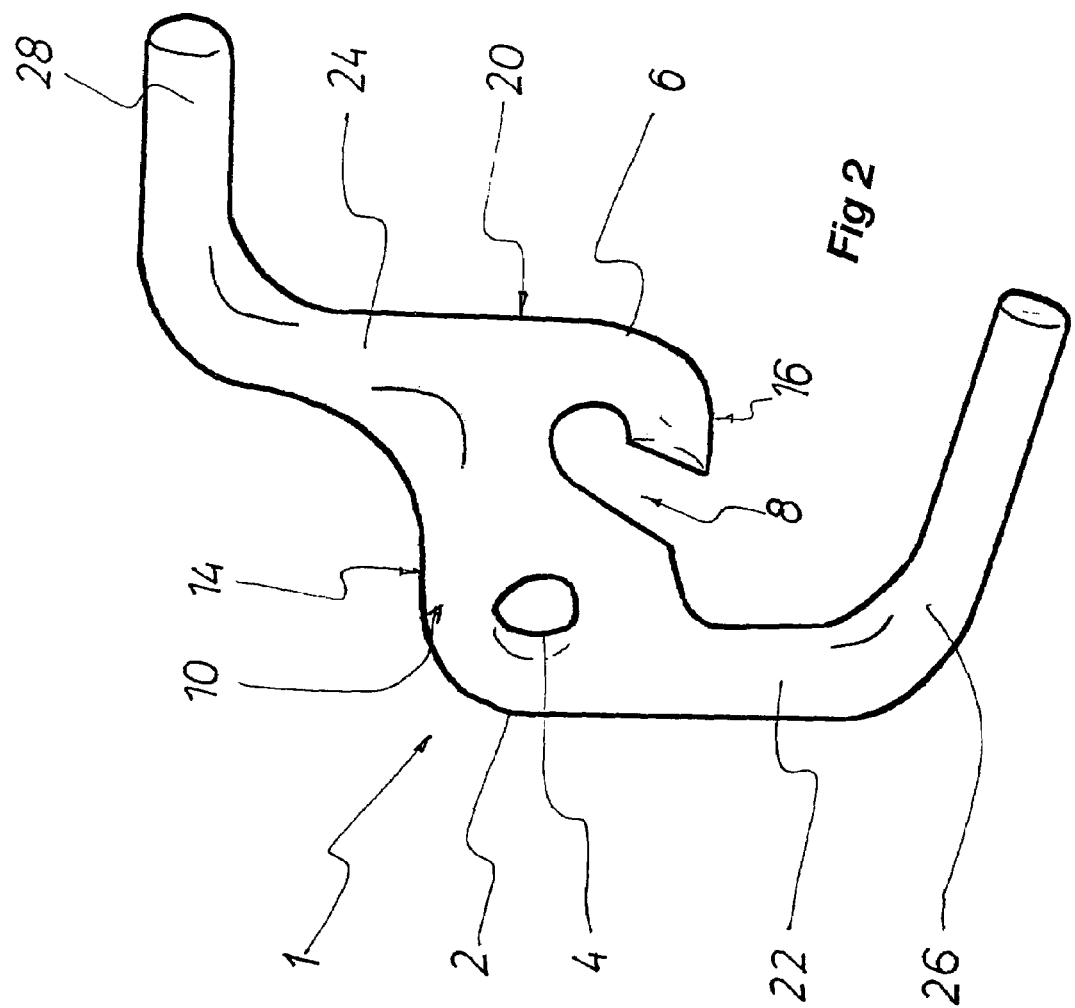
Figure 3A:
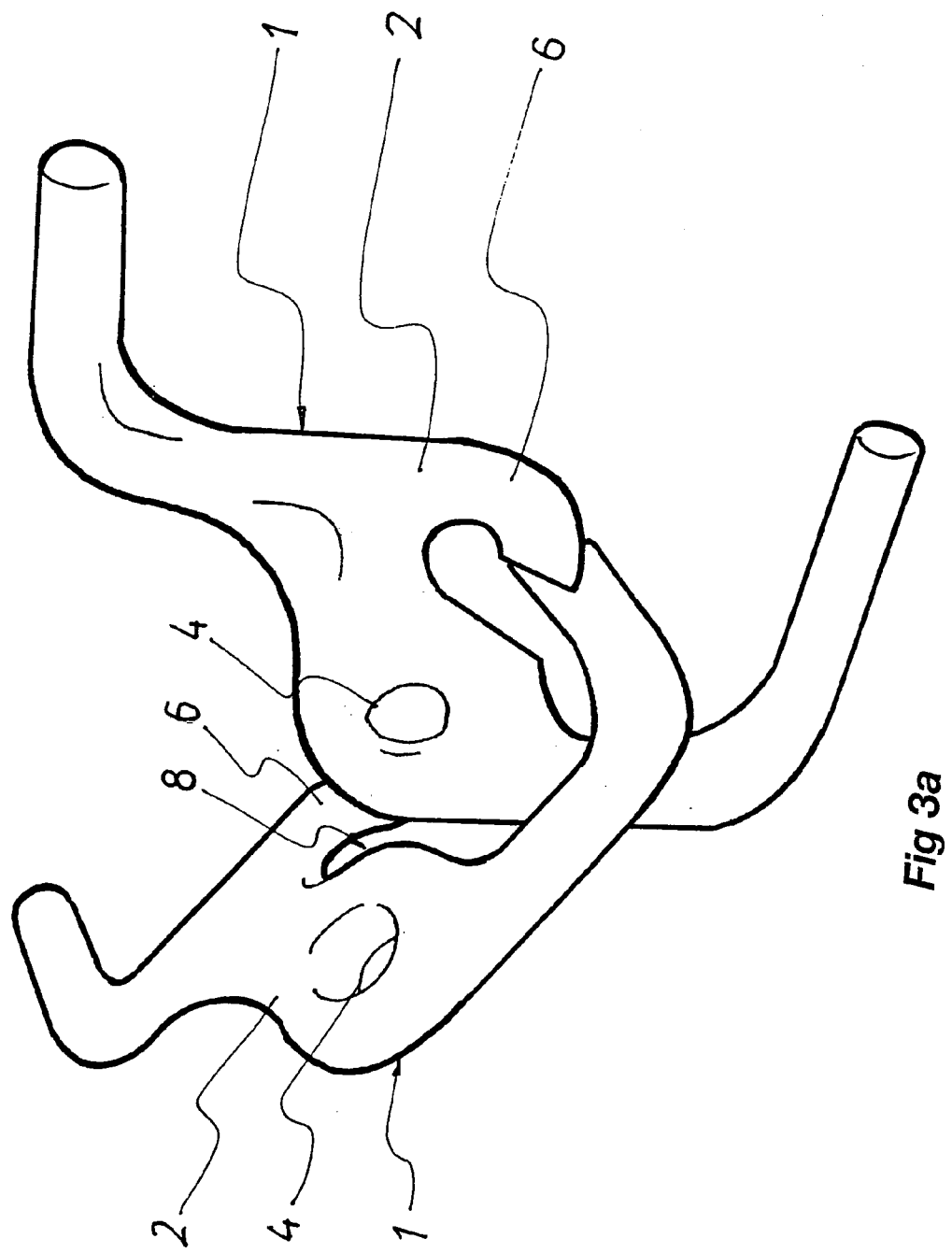
Figure 3B:
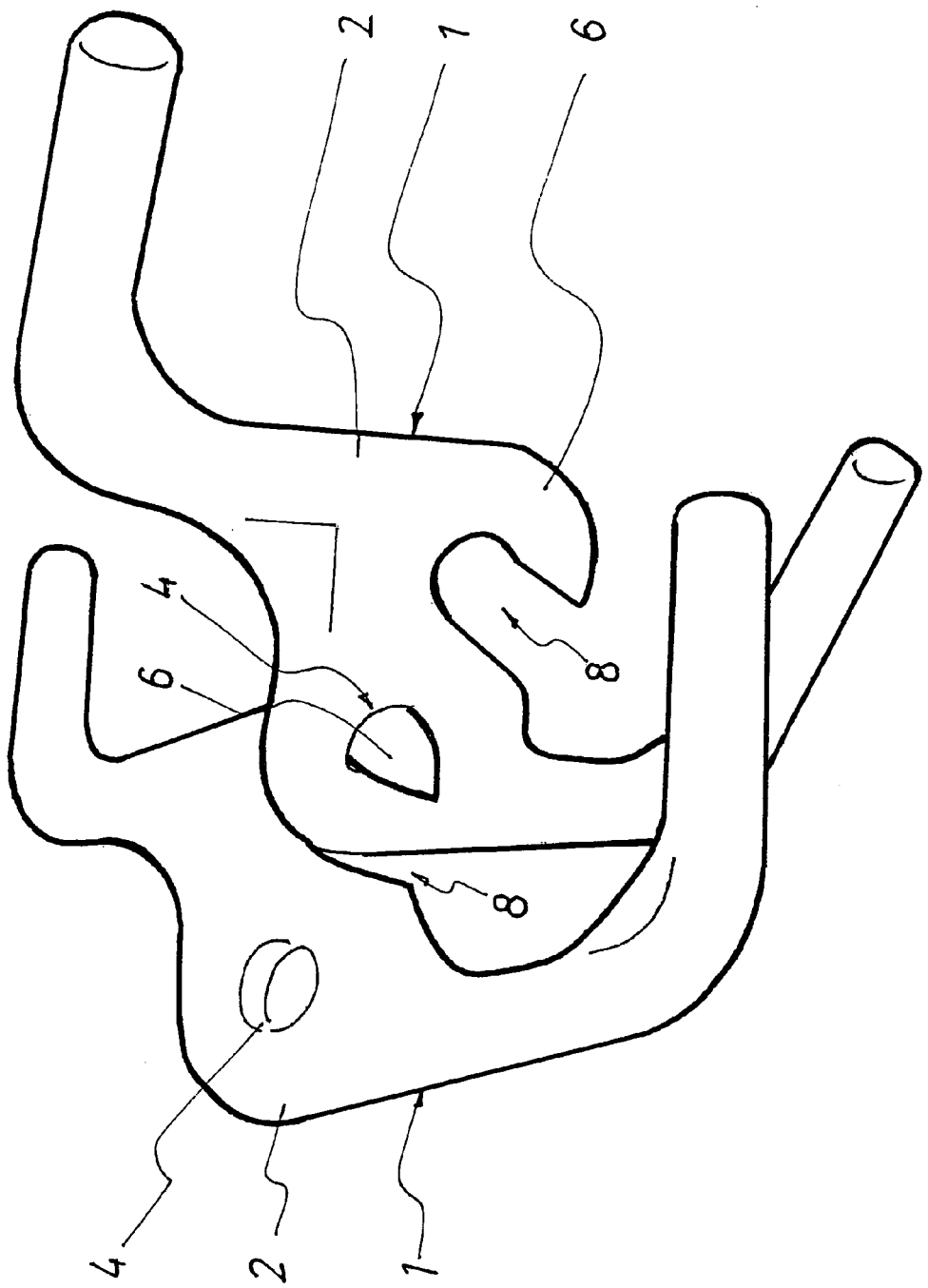
Figure 3C:
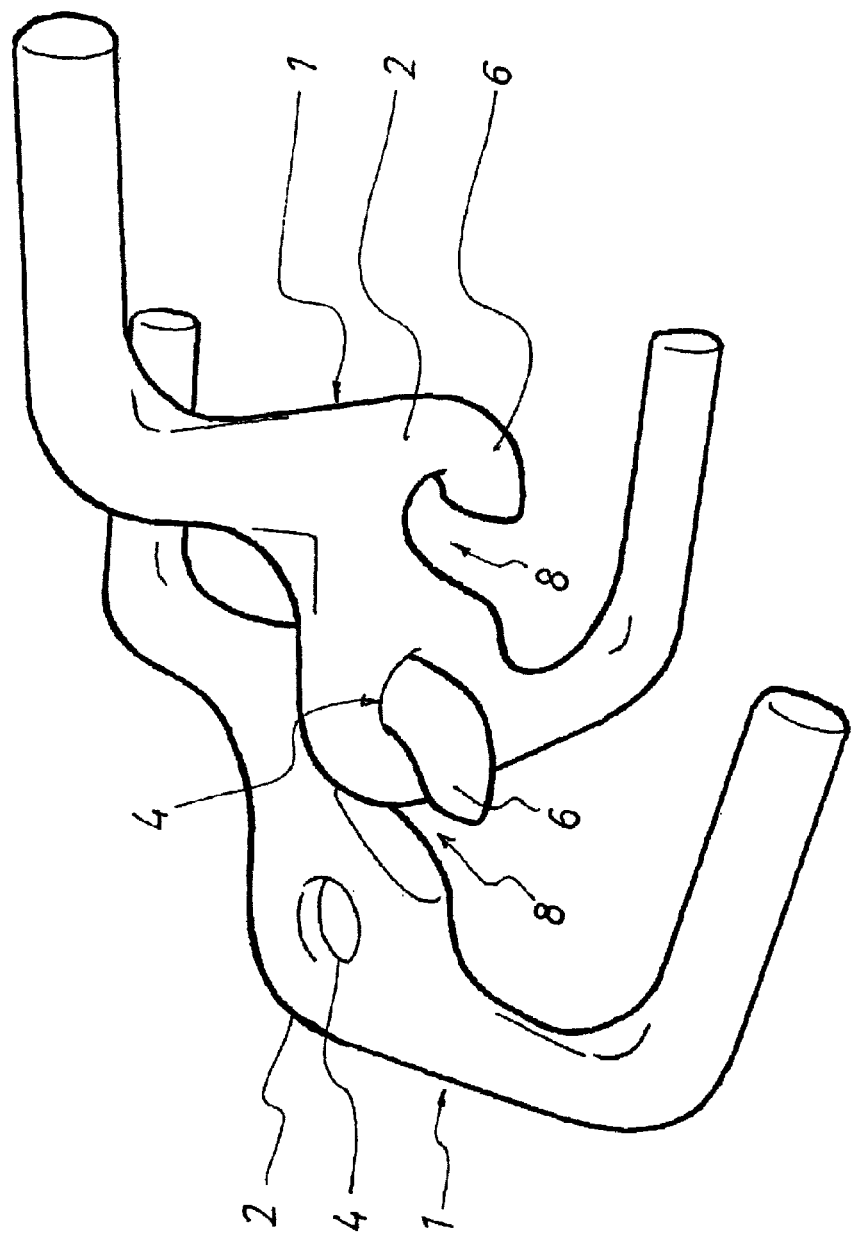
Figure 4:
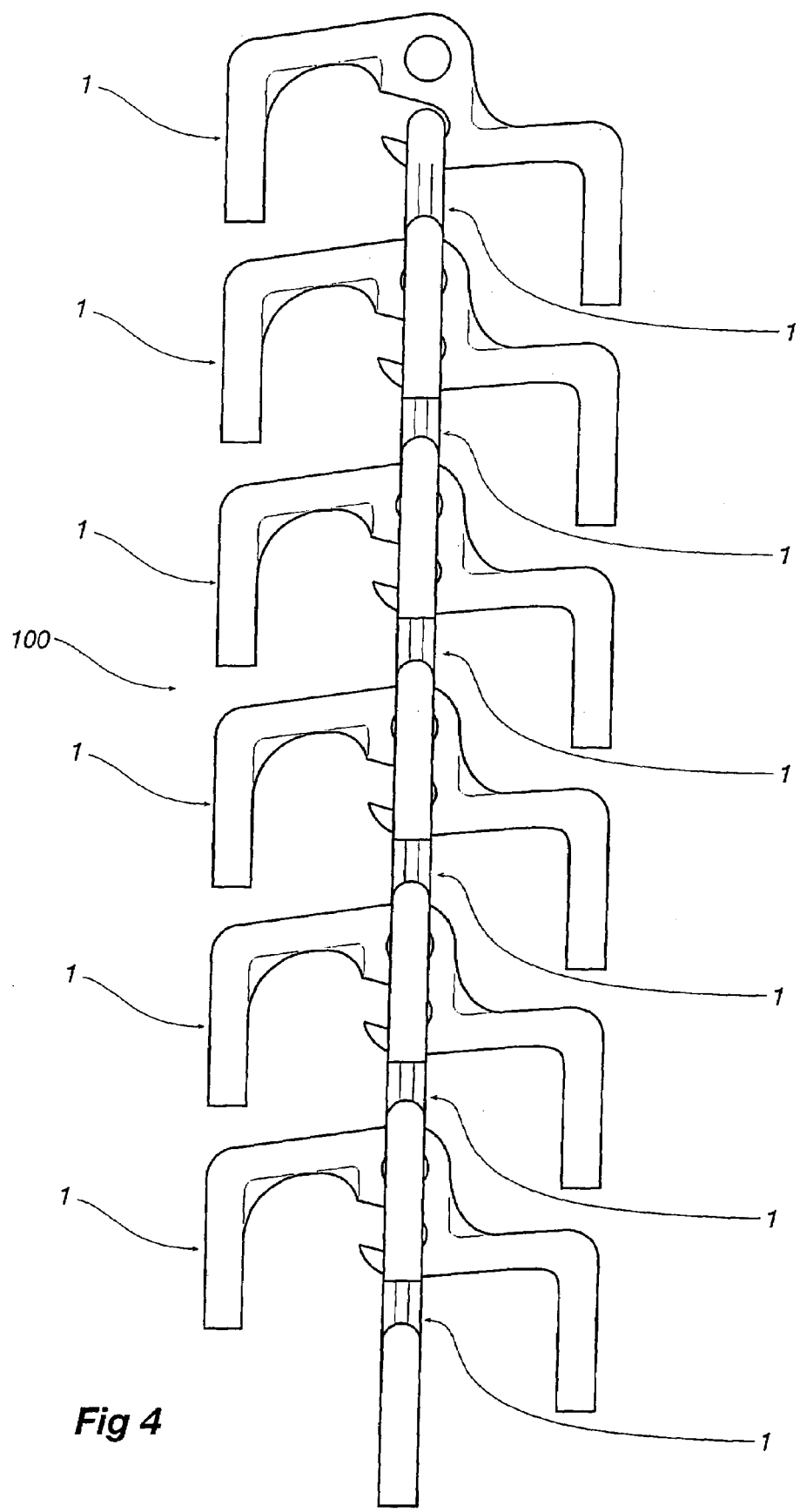

For a better understanding of this invention it will now be described with respect to the preferred embodiment which shall be described herein with the assistance of drawings wherein;

FIG. 1 is a plan view of a prickle chain link element according to the preferred embodiment of the present invention;

FIGS. 1a and b are side views of the prickle chain link element in FIG. 1;

FIG. 2 is a perspective view of the prickle chain link element in FIG. 1;

FIGS. 3a through c are perspective views of the prickle chain link element in FIG. 1, showing the element being linked with a second identical prickle chain link element; and FIG. 4 is a plan view of a prickle chain formed from the prickle chain link elements in FIG. 1.

Now referring to the illustrations, and in particular to FIG. 1, there is a prickle chain link element 1 that has been produced using a casting operation. A significant advantage of casting a prickle chain link element is that once the mold has been created, links of a complex shape, the likes of which would take a considerable amount of time to fabricate using bending and welding operations, can be made quickly and cheaply.

The element 1 has a body 2 which has a hole 4, and a hook 6 formed into it. The hook 6 defines a slot 8 through the body. This hook is adapted to engage the hole 4 formed into the body of another identical element.

The body 2 of each element has an opposed top 10 and bottom face 12, a pair of opposed side faces 14 and 16, and an opposed front edge and back face 18 and 20. The hole, and the slot created by the hook, pass through from the top face to the bottom face of the body.

There is a pair of outwardly projecting ground engaging fingers, a first portion of one finger projecting from each side of the body. A first portion of a first finger 22 projects from the body such that it is aligned with the front face 18 of the body, and the first portion of the second finger 24 projects from the body such that it is aligned with the rear face 20 of the body. Each of the ground engaging fingers has a second portion 26 and 28 that projects rearwardly.

The hole 4 is positioned near the front face 18 of the body, and the hook 6 is formed into the rear face 20 of the body, on the opposite side of the body to the finger in the rear face 24.

Referring now to FIGS. 2a through c, an identical pair of link elements 1 can be linked by engaging the hook 6 in the body of a first element, in the hole 4 in the body of a second identical element. Once the elements are linked, the first element lies in plain orthogonal to the elements linked to it on either side of the first element.

In this fashion a plurality of link elements 1 can be linked, one to the other to form a prickle chain 100.

The slot 8 defined by the hook is directed both inwardly and rearwardly into the body. In use a prickle chain 100 formed from these link elements will be under tension, and the link elements 1 will not disengage as this tension in the chain draws respective links into the slot 8 created by the hook 6.

It is considered that a prickle chain link element and a prickle chain made by interconnecting a plurality of these links according to the present invention, would be of considerable advantage to those who wish to make a plurality of links, and create a chain out of these links, quickly and cheaply.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A prickle chain link element including a body, the body having at least one hole passing through it, at least one hook formed into it, and at least a pair of outwardly projecting ground engaging fingers that extend from the body in opposing directions to one another.

2. The prickle chain link element as in claim 1, further characterized in that the element is produced using a casting operation.

3. The prickle chain link element as defined in claim 1, further characterized in that the hook in the body of the element defines a slot through the body.

4. The prickle chain link element as defined in claim 1, further characterized in that the hook formed into the body of one element, engages the hole formed into the body of another identical element.

5. The prickle chain link element as defined in claim 1, further characterized in that the body of each element has an opposed top and bottom face, a pair of opposed side faces, and an opposed front edge and back face.

6. The prickle chain link element as defined in claim 5 further characterized in that the hole, and the slot created by the hook, pass through from the top face to the bottom face of the body.

7. The prickle chain link element as defined in claim 5, further characterized in that one outwardly projecting ground engaging finger projects from each side face of the body.

8. The prickle chain link element as defined in claim 7, further characterized in that one ground engaging finger projects from the body such that it is aligned with a front face of the body, and the second ground engaging finger projects from the body such that it is aligned with the rear face of the body.

9. The prickle chain link element as defined in claim 8, further characterized in that the hole is positioned near the front face of the body, and the hook is formed into the rear face of the body, on the opposite side of the body to the ground-engaging finger in the rear face.

10. A prickle chain formed from a plurality of cast link elements as defined in claim 1.

11. A method of producing a prickle chain including the steps of casting a plurality of link elements as defined in claim 1, and then linking these elements in order to form a prickle chain.

12. The method of producing a prickle chain as defined in claim 11, further characterized in that the elements are linked by engaging the hook in the body of a first link element in the hole in the body of a second identical link element.

13. The method of producing a prickle chain as defined in claim 12, further characterized in that the elements are linked such that a first link element lies in a plain that is orthogonal to the elements linked to it on either side of the first element.

* * * * *